United States Patent
Daugherty et al.

(10) Patent No.: US 10,985,389 B1
(45) Date of Patent: Apr. 20, 2021

(54) METHODS AND DEVICES FOR TEMPERATURE CONTROLLED FUEL CELL

(71) Applicant: Tacit Intelligence LLC, Las Vegas, NV (US)

(72) Inventors: Jeremy S. Daugherty, Las Vegas, NV (US); Michael A. Meinhart, Washington, IN (US); Bryan G. Daugherty, Sandborn, IN (US); Alan W. Koenig, Fredericksburg, VA (US)

(73) Assignee: TACIT INTELLIGENCE LLC, Las Vegas, NV (US)

( * ) Notice: Subject to any disclaimer, the term of this patent is extended or adjusted under 35 U.S.C. 154(b) by 16 days.

(21) Appl. No.: 16/386,417

(22) Filed: Apr. 17, 2019

Related U.S. Application Data (60) Provisional application No. 62/664,777, filed on Apr. 30, 2018.

(51) Int. Cl.

| | |
|---|---|
| *H01M 8/04* | (2016.01) |
| *H01M 8/04701* | (2016.01) |
| *H01M 8/04858* | (2016.01) |
| *H01M 8/04537* | (2016.01) |
| *H01G 11/78* | (2013.01) |
| *H01M 8/04082* | (2016.01) |
| *H01M 8/0432* | (2016.01) |
| *H01G 11/08* | (2013.01) |
| *H01M 16/00* | (2006.01) |

(52) U.S. Cl.
CPC ........ *H01M 8/04708* (2013.01); *H01G 11/08* (2013.01); *H01G 11/78* (2013.01); *H01M 8/0432* (2013.01); *H01M 8/04216* (2013.01); *H01M 8/04567* (2013.01); *H01M 8/04917* (2013.01); *H01M 16/006* (2013.01)

(58) Field of Classification Search
CPC ......... H01M 8/04753; H01M 8/04559; H01M 8/04708; H01M 8/04216; H01M 8/0432
See application file for complete search history.

(56) References Cited

U.S. PATENT DOCUMENTS

| | | | |
|---|---|---|---|
| 2011/0065012 A1* | 3/2011 | Kwon ................. | H01M 16/006 429/429 |
| 2013/0045398 A1* | 2/2013 | Katano ................... | B60L 50/71 429/7 |
| 2013/0176759 A1* | 7/2013 | Kaneko ............. | H01M 8/04992 363/97 |
| 2015/0315017 A1* | 11/2015 | McGrady .............. | C01B 35/146 429/417 |
| 2016/0043420 A1* | 2/2016 | Thampan .......... | H01M 8/04208 429/423 |

* cited by examiner

*Primary Examiner* — Olatunji A Godo
(74) *Attorney, Agent, or Firm* — Snell & Wilmer L.L.P.

(57) ABSTRACT

A fuel cell power and control system may comprise a fuel cell stack configured to generate electric power, a fuel carrier for the fuel cell stack, at least one temperature control element in thermal communication with the fuel carrier, and an electronic control unit (ECU) configured to regulate electric current supplied to the temperature control element to control a rate at which a fuel is released from the fuel carrier. In various embodiments, the system further comprises an energy storage device configured to receive the electric power from the fuel cell stack. In various embodiments, the ECU is configured to vary the electric current supplied to the temperature control element in response to the voltage across the energy storage device varying.

14 Claims, 7 Drawing Sheets

METHODS AND DEVICES FOR TEMPERATURE CONTROLLED FUEL CELL

CROSS REFERENCE TO RELATED APPLICATIONS

This application claims priority to, and the benefit of, U.S. Provisional Patent Application Ser. No. 62/664,777, entitled "METHODS AND DEVICES FOR TEMPERATURE CONTROLLED FUEL CELL," filed on Apr. 30, 2018, which is hereby incorporated by reference in its entirety for all purposes.

FIELD

The present disclosure relates to fuel cell systems and in particular to systems and methods for controlling temperatures of a fuel cell.

BACKGROUND

An electrochemical fuel cell is a device that converts the chemical energy of a fuel into electrical energy. Typically, a fuel cell assembly consists of an anode (a positively charged electrode), a cathode (a negatively charged electrode) and an electrolyte in between the two electrodes. The electrolyte may be, for example, a proton exchange membrane, phosphoric acid, a molten carbonate, a solid oxide or an aqueous alkaline solution. Each electrode is coated with a catalyst layer. At the anode, a fuel, such as hydrogen, is converted catalytically to form cations and electrons. The cations migrate through the electrolyte to the cathode. At the cathode, an oxidant, such as oxygen, reacts at the catalyst layer to form anions. The reaction between anions and cations generates a reaction product and heat. Electricity is generated due to the flow of the electrons through an electrical circuit.

The current produced in a fuel cell is proportional to the size (area) of the electrodes. A single fuel cell typically produces a relatively small voltage (approximately 1 volt). To produce a higher voltage, several fuel cells are connected, either in series or in parallel, through plates separating adjacent fuel cells (i.e., "stacked").

A common fuel and oxidant used in fuel cells are hydrogen and oxygen. In such fuel cells, the reactions taking place at the anode and cathode are represented by the equations (I) and (II):

Anode reaction: $H_2 \rightarrow 2H^+ + 2e^-$ (I)

Cathode reaction: $\tfrac{1}{2}O_2 + 2H^+ + 2e^- \rightarrow H_2O$ (II)

The oxygen used in fuel cells generally comes from air. The hydrogen used can be in the form of hydrogen gas or "reformed" hydrogen. Reformed hydrogen is produced by a reformer, an optional component in a fuel cell assembly, whereby hydrocarbon fuels (e.g., methanol, natural gas, gasoline or the like) are converted into hydrogen. The reformation reaction produces heat, as well as hydrogen.

Fuel and oxidant may be channeled through anode and cathode flow plates. In a fuel cell stack, a bipolar plate may be used to channel both the fuel and the oxidant—one side of the bipolar plate channels fuel to the anode of one cell and the other side of the bipolar plate channels oxidant to the cathode of the adjacent cell in the stack.

There are various types of fuel cells, categorized by their electrolyte (solid or liquid), operating temperature, and fuel preferences. Categories of fuel cells include: proton exchange membrane fuel cell ("PEMFC), phosphoric acid fuel cell ("PAFC), molten carbonate fuel cell ("MCFC), solid oxide fuel cell ("SOFC), and alkaline fuel cell ("AFC").

The PEMFC, also known as polymer electrolyte membrane fuel cell, uses an ion exchange membrane as an electrolyte. The membrane permits only protons to pass between the anode and the cathode. In a PEMFC, hydrogen fuel is introduced to the anode where it is catalytically oxidized to release electrons and form protons. The electrons travel in the form of an electric current through an external circuit to the cathode. At the same time, the protons diffuse through the membrane to the cathode, where they react with oxygen to produce water, thus completing the overall process. PEMFC's operate at relatively low temperatures (50-100° C. or 122-212° F.).

The PAR; uses phosphoric acid as an electrolyte. The operating temperature range of a PAFC is about 300-400 F. PAFCs may not be sensitive to fuel impurities. This broadens the choice of fuels that they can use.

The MCFC uses an alkali metal carbonate (e.g., Li", Na" or K") as the electrolyte. In order for the alkali metal carbonate to function as an electrolyte, it typically must be in liquid form. As a result, MCFC's operate at temperatures of about 1200 F. Such a high operating temperature may be required to achieve sufficient conductivity of the electrolyte. It may also allow for greater flexibility in the choice of fuels (i.e., reformed hydrogen).

The SOFC uses a solid, nonporous metal oxide as the electrolyte, rather than an electrolyte in liquid form. SOFCs, like MCFCs, operate at high temperatures, ranging from about 700 to about 1000° C. (1290 to 1830 F). The high operating temperature of SOFCs may allow for greater flexibility in the choice of fuels. Due to the solid-state character the electrolyte, the configuration of the fuel cell assembly may not be restricted (i.e., an SOFC can be designed in planar or tubular configurations).

The AFC uses an aqueous solution of alkaline potassium hydroxide as the electrolyte. Their operating temperature is typically from about 150 to about 200° C. (about 300-400 F). The cathode reaction of an AFC may be faster in alkaline electrolytes than in acidic electrolytes.

Ammonia borane (AB, $NH_3BH_3$) is considered to be a promising hydrogen storage material as it contains 19.6 wt % hydrogen. Desirable characteristics for hydrogen release for utilization in vehicles powered by fuel cells include fast, controlled, and complete release. The hydrogen should be fast enough to power fuel cells in times of acceleration when more energy is needed. The $H_2$-release should also be both controllable so that it can be turned off and have a consistent release rate so there are no spikes of hydrogen when it is not needed. Lastly, in order to achieve a high materials weight percent, most of the hydrogen should be released or the hydrogen yield will be low. Furthermore, for portable applications, it is desirable that the system used for $H_2$-release as a whole be light-weight and compact.

SUMMARY

A fuel cell power and control system is disclosed, comprising a fuel cell stack configured to generate electric power, a fuel carrier for the fuel cell stack, a temperature control element in thermal communication with the fuel carrier, and an electronic control unit (ECU) configured to regulate electric current supplied to the temperature control element to vary a rate at which a fuel is released from the fuel carrier.

In various embodiments, the system further comprises an energy storage device configured to receive the electric power from the fuel cell stack.

In various embodiments, the system further comprises a sensor configured to measure a voltage across the energy storage device.

In various embodiments, the ECU is configured to change the electric current supplied to the temperature control element in response to the voltage across the energy storage device decreasing.

In various embodiments, the ECU is configured to increase the electric current supplied to the temperature control element in response to the voltage across the energy storage device decreasing.)

In various embodiments, the fuel cell stack comprises a fuel cell assembly comprising an anode plate, a cathode plate, and an electrolyte disposed between the anode plate and the cathode plate.

In various embodiments, the fuel carrier comprises ammonia borane (AB, $NH_3BH_3$).

In various embodiments, the fuel carrier comprises nickel (Ni).

In various embodiments, the system further comprises a container wherein the fuel carrier and the temperature control element are contained, and a housing wherein the energy storage device is contained, wherein the container is removably coupled to the housing via an interface.

In various embodiments, the fuel cell stack is coupled to the housing, and the interface is disposed between the fuel cell stack and the container.

In various embodiments, the system further comprises a first interface surface disposed on the container and a second interface surface disposed on the fuel cell stack, wherein the first interface surface interfaces with the second interface surface.

In various embodiments, the system further comprises a fuel outlet port disposed on the first interface surface and a fuel inlet port is disposed on the second interface surface.

In various embodiments, the system further comprises an alignment pin extending from the first interface surface and a pin aperture disposed on the second interface surface, wherein the pin aperture receives the alignment pin.

In various embodiments, the system further comprises a first temperature sensor relay disposed on the first interface surface and a second temperature sensor relay disposed on the second interface surface, wherein the first temperature sensor relay and the second temperature sensor relay contact each other in response to the container being installed onto the fuel cell stack.

In various embodiments, the system further comprises a temperature sensor disposed in the container.

In various embodiments, the system further comprises an attachment feature extending across the first interface surface and the second interface surface.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended statements.

The connecting lines shown in various figures contained herein are intended to represent exemplary functional relationships and/or physical couplings between various elements. It should be noted that many alternative or additional functional relationships or physical connections may be present in a practical system or related methods of use.

Throughout the specification and claims, the word "comprise," or variations such as "comprises" or "comprising," will be understood to imply the inclusion of a stated integer or group of integers but not the exclusion of any other integer or group of integers.

A fuel cell power and control system in accordance with principles of the present disclosure may be configured with any suitable components, structures, and/or elements in order to provide desired dimensional, mechanical, electrical, chemical, and/or thermal properties.

In order to further define this disclosure, the following terms and definitions are herein provided.

As used herein, "fuel cell assembly" refers to the combination comprising an anode plate, a cathode plate and an electrolyte. Cathode and anode plates may be bipolar plates.

As used herein, the term "electrode" refers to an electrocatalytically active layer where an electrochemical reaction takes place.

As used herein, the term "anode" refers to the electrode at which fuel is oxidized.

As used herein, the term "cathode" refers to the electrode at which oxygen is reduced.

As used herein, the term "electrolyte" refers to a medium through which ions are conducted.

As used herein, the term "fuel cell stack" refers to a plurality of fuel cell assemblies in electrical connection.

The following abbreviations are also used herein "PEMFC" refers to a proton-exchange membrane fuel cell; "PAFC" refers to a phosphoric acid fuel cell; "MCFC" refers to molten carbonate fuel cell; "SOFC refers to a solid oxide fuel cell; and "AFC" refers to an alkaline fuel cell; PEM refers to a proton-exchange membrane (also referred to as a polymer-electrolyte membrane); and AB refers to ammonia borane.

The fuel cell assembly may be any type of fuel Cell assembly including PEMFC, PAFC, MCFC, SOFC, and AFC.

The electrolyte may be any type of known electrolyte including an ion exchange membrane, phosphoric acid, an alkali metal carbonate (e.g., Li, Na' or K), a solid, nonporous metal oxide and an aqueous solution of alkaline potassium hydroxide.

A fuel cell power and control system, as described herein, may include a fuel cell having a temperature sensitive fuel carrier in thermal communication with one or more temperature control elements. The temperature control elements may be heated to increase the release of fuel supplied to the fuel cell stack, thereby increasing the power output of the fuel cell stack. The power output of the fuel cell stack may be increased during a high-power event, such as in response to increased power supplied to a motor for example. The temperature control elements may be cooled to decrease the release of fuel supplied to the fuel cell stack, thereby decreasing the power output of the fuel cell stack. The power output of the fuel cell stack may be decreased during a low power event; such as in response to little or no power being supplied to a motor for example. In one exemplary embodiment, an electronic control unit causes an increase in power supplied by the fuel cell stack in response to a decrease in voltage across an energy storage device.

Figure 1:
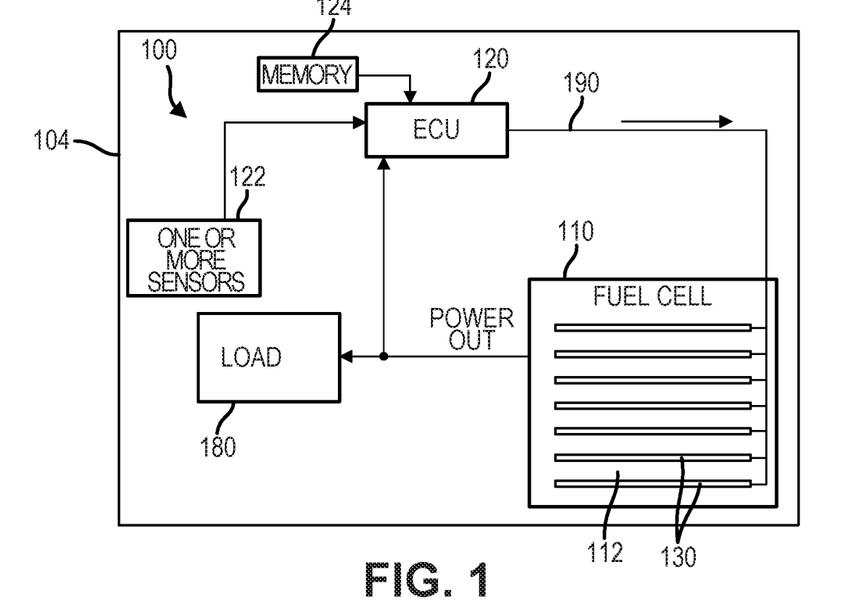
FIG. 1 illustrates a schematic view of a fuel cell power and control system having a fuel cell supplying electric power to a load in accordance with aspects of the present disclosure.

With reference to FIG. 1, a block diagram of a fuel cell power and control system ("system") 100 is illustrated, in accordance with various embodiments. System 100 may include a fuel cell 110, an electronic control unit (ECU) 120, and one or more temperature control elements 130 for heating and/or cooling a fuel carrier 112 to vary the rate at which a fuel is released from the fuel carrier 112.

In various embodiments; fuel cell 110 may be fueled by hydrogen or any other suitable fuel. A fuel carrier may be a chemical compound from which the fuel is extracted. In one exemplary embodiment, hydrogen ($H_2$) fuel is derived from an ammonia borane (AB, $NH_3BH_3$) fuel carrier. In a further exemplary embodiment, hydrogen ($H_2$) fuel is derived from a nickel AB ($NiNH_3BH_3$) fuel carrier. However, any suitable fuel and fuel carrier may be used for fuel cell 110.

System 100 includes a processor, such as the ECU 120. ECU 120 may be implemented as a single ECU or as multiple ECUs. The ECU 120 may be electrically coupled to some or all of the components of a vehicle 104. In various embodiments, the vehicle may comprise a ground vehicle, an air vehicle, or a water vehicle. In one exemplary embodiment, the vehicle comprises an autonomous aircraft. The ECU 120 may control the temperature of the one or more temperature control elements 130 based upon a request for more and/or less power due to a change in the load 180. In one exemplary embodiment, load 180 may comprise a motor, wherein a change in the load 180 may correspond to an increase and/or decrease in electrical loading on the motor and/or in response to an increase and/or or decrease in rotational velocity of the motor. However, any change in a load 180 which causes the load 180 to draw more power is contemplated herein.

System 100 may include a memory 124 that may be coupled to the ECU 120. The memory 124 stores instructions that are executed by the ECU 120. The memory 124 may include one or more of a Random Access Memory (RAM) or other volatile or non-volatile memory. The memory 124 may be a non-transitory memory or a data storage device, such as a hard disk drive, a solid-state disk drive, a hybrid disk drive, or other appropriate data storage, and may further store machine-readable instructions, which may be loaded and executed by the ECU 120.

Figure 4:
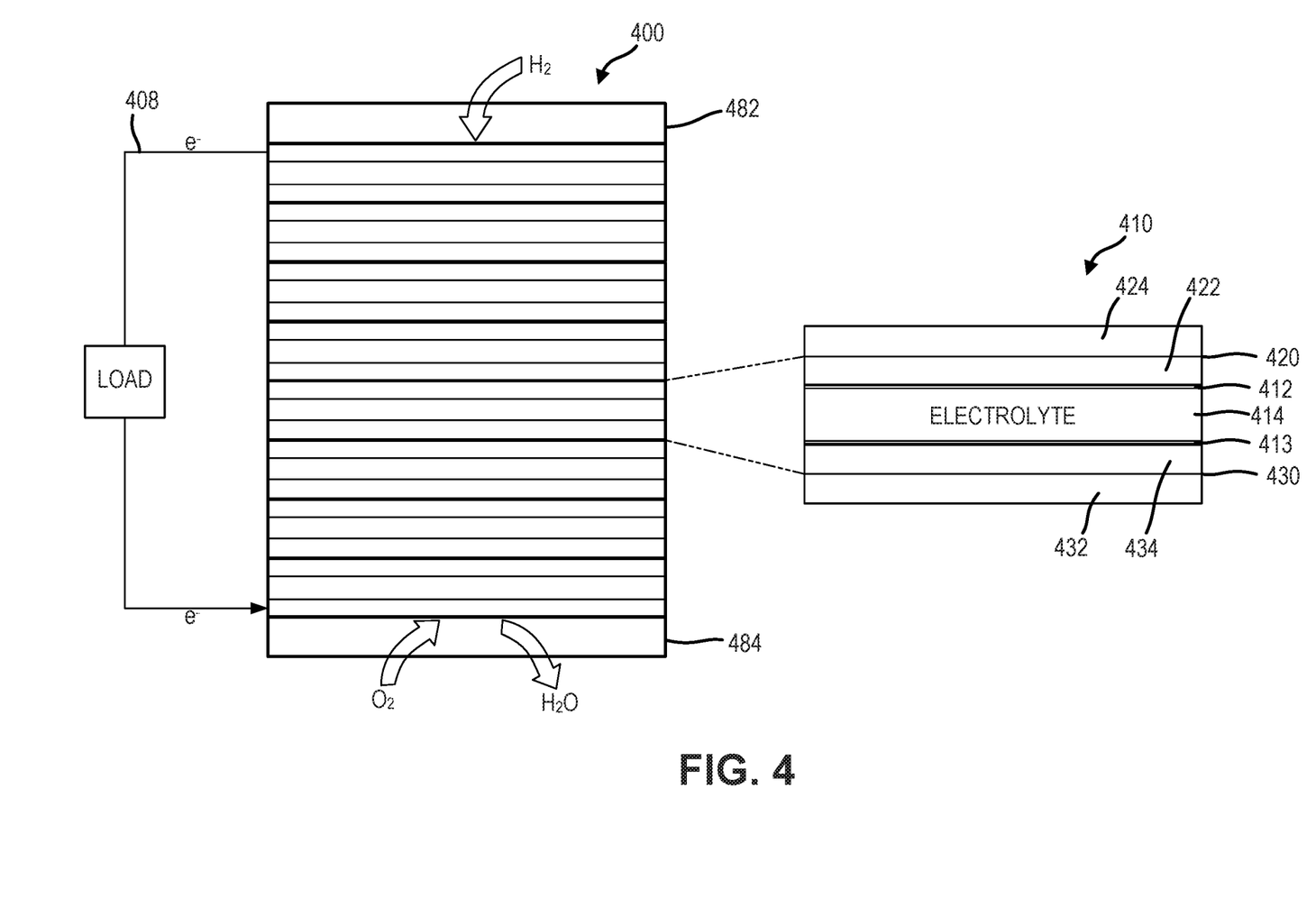
FIG. 4 illustrates an example fuel cell stack in accordance with aspects of the present disclosure.

System 100 includes a fuel cell 110. The fuel cell 110 converts chemical energy from the fuel into electricity through an electrochemical reaction of fuel (e.g., a hydrogen fuel) with an oxidizing agent such as oxygen. In this manner, power may be supplied to a load 180. The fuel cell 110 may chemically fuse oxygen from the air and hydrogen from a fuel source to make water and release electrical energy that powers the load 180 of the vehicle 104. FIG. 4 further describes the fuel cell 110.

In various embodiments, the one or more temperature control elements 130 comprises a resistive heating element configured to resistively heat in response to electrical current flowing there through. In this regard, the one or more temperature control elements 130 may be caused to increase in temperature ("heat") in response to an increase in electrical current flowing there through and may be caused to decrease in temperature ("cool") in response to a decrease in electrical current flowing there through.

In further embodiments, the one or more temperature control elements 130 may be a thermoelectric module, including, for example, a Peltier device, a thermoelectric cooler (TE or TEC), a thermoelectric module, a heat pump, and/or a thermoelectric power generator. Peltier devices transfer heat based on the Peltier effect. According to the Peltier effect, heat is absorbed or released when electrical current flows through dissimilar conductors. A Peltier device may have dimensions in the millimeter to centimeter range, though they can be much larger or smaller. A Peltier device is a thin sandwich of an array of bismuth telluride cubes ("couples') between two rectangular or square ceramic plates. Peltier devices may be used to both heat and cool an object. The device transfers heat from an object being cooled when a DC current is applied. The heat is transferred to a heat sink. When the current is reversed, heat is transferred to the object. Thus, reversing the polarity of the applied voltage can reverse the direction of heat transfer. Because the heat transfer of the Peltier device is proportional to the current supplied, varying the power supply voltage can control the amount of heat transfer. In this regard, the one or more temperature control elements 130 may be caused to increase in temperature in response to varying a DC current flowing there through and/or in response to reversing the polarity of the voltage applied there across. Moreover, any suitable device may be used to heat or cool or otherwise control the temperature of the fuel carrier 112.

The one or more temperature control elements 130 may be formed as rods, films, plates, wires, or a mesh, among others. The one or more temperature control elements 130 may be made from a metal, a metal alloy, a ceramic, or any other electrically conductive material. In various embodiments, the one or more temperature control elements 130 are made from nickel plated copper wires. In various embodiments, the one or more temperature control elements 130 are made from tungsten. In various embodiments, the one or more temperature control elements 130 are made from magnesium. In various embodiments, the one or more temperature control elements 130 may be capable of generating up to 250° C. (482° F.).

System 100 includes one or more sensors 122. In various embodiments, the one or more sensors 122 may monitor, measure, detect, and/or otherwise obtain data regarding power being supplied to load 180. ECU 120 may be configured to vary electrical current supplied to the one or more temperature control elements from fuel cell 110 in response to a need for more and/or less power due to a change in load 180. ECU 120 may determine the need for more power in response to feedback from the one or more sensors 122. Various methods may be used to determine the need for more and/or less power. For example, in one exemplary embodiment, the one or more sensors 122 may comprise a voltmeter for detecting a change in voltage across load 180. In another exemplary embodiment, the one or more sensors 122 may comprise an ammeter for detecting a change in electrical current being supplied to load 180. In still further embodiments, ECU 120 may determine the need for more and/or less power based upon a command signal issued by a processor, e.g. ECU 120, commanding a change, e.g., rotational velocity of a motor, in load 180. However, any method for determining a change in load 180 may be suitable.

Figure 3:
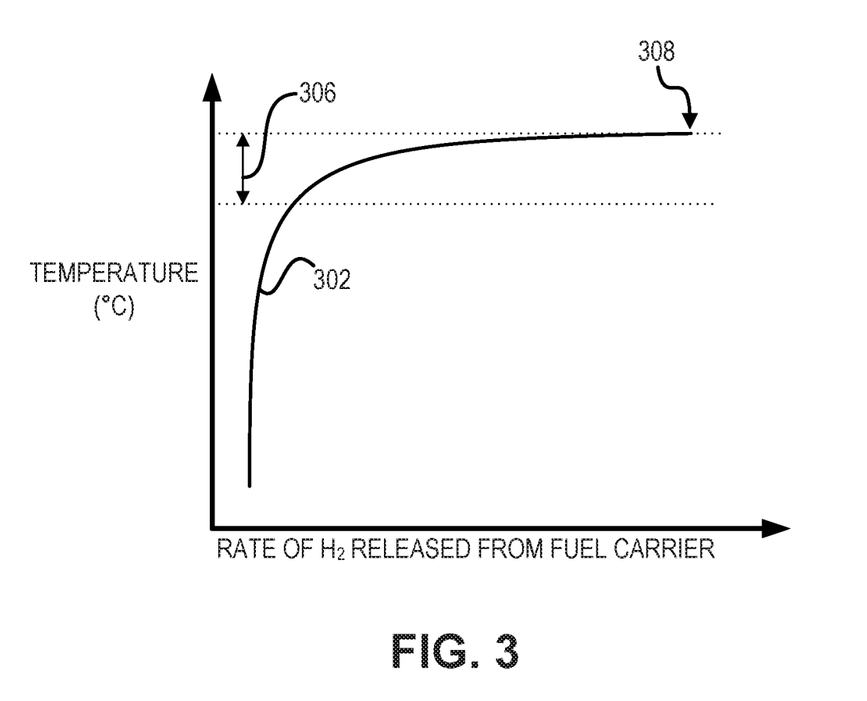
FIG. 3 illustrates a plot of a temperature-release curve of a temperature sensitive fuel carrier in accordance with aspects of the present disclosure.

The one or more temperature control elements 130 may be in thermal communication with the fuel carrier 112 of fuel cell 110. In this regard, causing the temperature of the one or more temperature control elements 130 to vary may cause the temperature of the fuel carrier 112 to likewise vary. As illustrated in FIG. 3, the rate of fuel, e.g., released from the fuel carrier 112 may increase in response to the temperature of the fuel increasing. Likewise, the rate of fuel, e.g., $H_2$, released from the fuel carrier 112 may decrease in response to the temperature of the fuel decreasing. The power output of fuel cell 110 may be proportional to the rate at which hydrogen is supplied to fuel cell 110. In this regard, the power output of fuel cell 110 may increase in response to the one or more temperature control elements 130 increasing in temperature and may decrease in response to the one or more temperature control elements 130 decreasing in temperature. Conversely, the power output of fuel cell 110 may decrease in response to the one or more temperature control elements 130 decreasing in temperature. Thus, ECU 120 may selectively vary the power output of fuel cell 110 via the one or more temperature control elements 130 by varying the electrical current supplied to the one or more temperature control elements, based upon a need for more or less power to load 180.

As described above, increasing the temperature of fuel carrier 112 may increase the power output of fuel cell 110, causing the fuel cell 110 to provide sufficient power in response to the need for additional power to load 180. However, in response to a decrease in the need for power to load 180, ECU 120 may cause power output of fuel cell 110 to decrease by causing the temperature of the one or more control elements 130 to decrease. In this manner, the life of the fuel cell 110 may be extended by reserving fuel during times when additional power is not desirable. For example, in various embodiments vehicle 104 may comprise an autonomous aircraft. In this regard, the range of vehicle 104 may be increased by regulating the power output of fuel cell 110 when additional power is not desired.

Moreover, having described various embodiments where the supply of electrical current to the one or more temperature control elements 130 is varied for varying the temperature of fuel carrier 112, the temperature of fuel carrier 112 may be varied by simply turning off the one or more temperature control elements 130, e.g. stopping the flow of electrical current. In one exemplary embodiment, fuel carrier 112 may be cooled by stopping (or reducing) the flow of electrical current to the one or more temperature control elements 130, thereby reducing the power output of fuel cell 110. In this regard, the range of vehicle 104 may be further increased from the energy conserved in response to both the stopping (or reducing) of the flow of electrical current to the one or more temperature control elements 130 as well as the reducing of the power output of fuel cell 110. In another exemplary embodiment, fuel carrier 112 may be heated by stopping (or reducing) the flow of electrical current to the one or more temperature control elements 130, thereby increasing the power output of fuel cell 110. For example, fuel carrier 112 may be heated in response to stopping (or reducing) the flow of electrical current to a temperature control element that is cooling the fuel carrier 112.

In various embodiments, the one or more sensors 122 may monitor, measure, detect, and/or otherwise obtain data regarding the temperature of the one or more temperature control elements 130. ECU 120 may regulate the power being supplied to the one or more temperature control elements 130 based upon temperature feedback from the one or more sensors 122.

In various embodiments, the one or more temperature control elements 130 may be comprised of separately controlled portions for heating and/or cooling fuel carrier 112. In this regard, the one or more temperature control elements 130 may comprise a first plurality of elements dedicated for cooling fuel carrier 112 and a second plurality of elements dedicated for heating fuel carrier 112.

With particular focus on FIG. 3, a fuel carrier may be chosen to have a temperature-release curve 302. Temperature-release curve 302 may comprise a region 306 where the rate of release of the fuel from the fuel carrier is temperature sensitive. In this regard, the term "temperature sensitive fuel carrier" may refer to a fuel carrier (e.g., AB) having a region, e.g. region 306, of fuel release rate which is variable between a majority of its fuel release limits in response to a relatively small change in temperature of the fuel carrier. For example, temperature-release curve 302 is variable between about 10% of its maximum release rate 308 and 100% of its maximum release rate 308 within region 306. In this regard, minimal energy is used in a temperature control element to vary a release rate of a temperature sensitive fuel carrier. In various embodiments, a fuel release rate may be measured in moles per second.

In various embodiments, AB may comprise temperature-release curve 302. In various embodiments, nickel AB may comprise temperature-release curve 302. However, any suitable fuel carrier comprising a rate of release of the fuel from the fuel carrier that is temperature sensitive may be used.

In various embodiments, load 180 may comprise a motor. In this regard, various electronic control units and/or power conditioning components may be used to control and/or condition the power to be suitably used for a motor. For example, various electronic control units and/or power conditioning components may include an inverter for converting a DC power output of fuel cell 110 to a signal, e.g. a three-phase AC power signal, suitable for powering a motor. Alternatively, the motor can be a DC motor. Suitable electronic control units and/or power conditioning components are not shown in FIG. 1 for clarity purposes.

Figure 2:
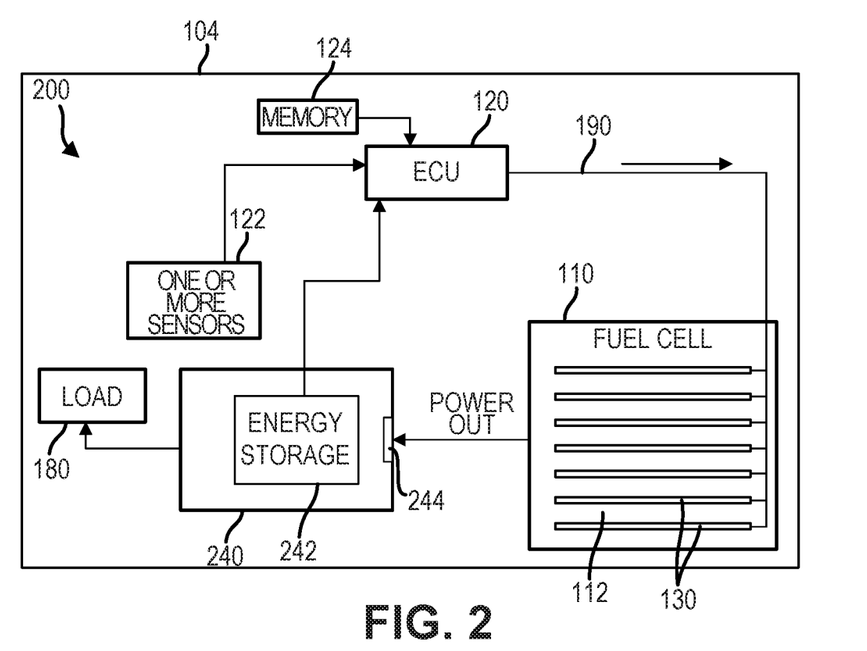
FIG. 2 illustrates a schematic view of a fuel cell power and control system having a fuel cell supplying electric power to an energy storage device in accordance with aspects of the present disclosure.

With respect to FIG. 2, elements with like element numbering, as depicted in FIG. 1, are intended to be the same and will not necessarily be repeated for the sake of clarity.

With reference to FIG. 2, a block diagram of a fuel cell power and control system ("system") 200 is illustrated, in accordance with various embodiments. System 200 may be similar to system 100 of FIG. 1, except that system 200 further includes an energy storage unit 240. Energy storage unit 240 may be coupled to fuel cell 110 via an interface 244. Interface 244 may comprise a quick disconnect interface suitable for rapid connect and disconnect between energy storage unit 240 and at least a portion of fuel cell 110.

Energy storage unit 240 may comprise an energy storage device 242. In various embodiments, energy storage device 242 may comprise a supercapacitor, a high voltage capacitor, an ultracapacitor, a battery, or any other suitable energy storage device, Energy storage device 242 may be charged with electrical energy from fuel cell 110. Load 180 may receive power from energy storage device 242, By coupling energy storage device 242 between fuel cell 110 and load 180, power supplied to load 180 may be regulated, e.g., to mitigate or reduce spikes or lows in power. Fuel cell 110 may supply power to energy storage device 242 in response to load 180 using power supplied from energy, storage device 242. In this regard, energy storage device 242 may undergo various charge and discharge cycles.

The one or more sensors 122 may monitor, measure, detect, and/or otherwise obtain data regarding the voltage across energy storage device 242 and send this data to ECU 120. In various embodiments, ECU 120 may regulate the electrical current supplied to the one or more temperature control elements 130 based upon the voltage across energy storage device 242. In this regard, energy storage device 242 may be configured to supply electrical current to the one or more temperature control elements 130 to heat and/or cool fuel carrier 112 in response to a change in voltage across energy storage device 242. The temperature of the fuel in fuel cell 110 may vary in response to the electrical current being supplied to the one or more temperature control elements 130, varying the rate of fuel released from fuel carrier 112, and therefore varying the power output of fuel cell 110. Furthermore, fuel cell 110 may supply power to energy storage device 242 in response to a decrease in voltage across energy storage device 242, thereby increasing the voltage across the energy storage device 242 until the energy storage device 242 reaches a desired charge, such as fully charged for example.

In other example embodiments, additional feedback may be provided to ECU 120 to assist in control of the one or more temperature control elements 130. For example, control signals driving the load 180 can be used by ECU 120 to predict a need for electric power in energy storage unit 240.

In various embodiments, ECU 120 may be located in any suitable location, such as in fuel cell 110 or energy storage unit 240. In various embodiments, ECU 120 may be located externally from fuel cell 110 and energy storage unit 240.

With reference to FIG. 4, an exemplary fuel cell stack 400 is illustrated. In various embodiments, fuel cell 110 of FIG. 1 may comprise fuel cell stack 400. Fuel cell stack 400 uses an electrochemical reaction of hydrogen fuel with oxygen or another oxidizing agent to generate electrical energy.

Fuel cell assembly 410 is one unit of a fuel cell stack 400. Fuel cell assembly 410 comprises an electrolyte 414 disposed between electrodes (i.e., bipolar plate 420 and bipolar plate 430). Bipolar plate 420 serves as the anode plate 422 of fuel cell assembly 410 and the cathode plate 424 of the adjacent fuel cell assembly. Bipolar plate 430 serves as the cathode plate 434 of fuel cell assembly 410 and the anode plate 432 of the adjacent cell assembly. An anode catalyst 412 is disposed between electrolyte 414 and anode plate 422. A cathode catalyst 413 is disposed between electrolyte 414 and cathode plate 434.

At anode plate 422, catalyst 412 oxidizes the fuel, e.g., hydrogen, to convert the fuel to a positively charged ion and a negatively charged ion. The ions travel from the anode 422 to the cathode plate 434 through the electrolyte 414. Electrolyte 414 prevents electrons from passing through. The electrons instead pass through a wire 408 creating the electric current. The ions reunite with the electrons in the cathode where a cathode catalyst reacts the electrons with another gas, such as oxygen, to form water. End plates 482, 484 may be coupled to either side of the fuel cell stack. In various embodiments, end plate 482 may provide connections to a fuel source. In various embodiments, end plate 484 may provide connections to an air source and an outlet for water and/or water vapor.

As illustrated, individual fuel cell assemblies are stacked in series to achieve a desired voltage and power of the fuel cell stack 400. Increasing the number of fuel cell assemblies in a stack will increase the voltage, while increasing the surface area of the cells will increase the current.

In various embodiments, electrolyte 414 comprises a polymer electrolyte membrane (PEM). In this regard, fuel cell stack 400 may comprise a PEMFC. However, in various embodiments, fuel cell stack 400 may comprise any suitable type of fuel cell assembly including PAFC, MCFC, SOFC, and AFC.

Figure 5A:
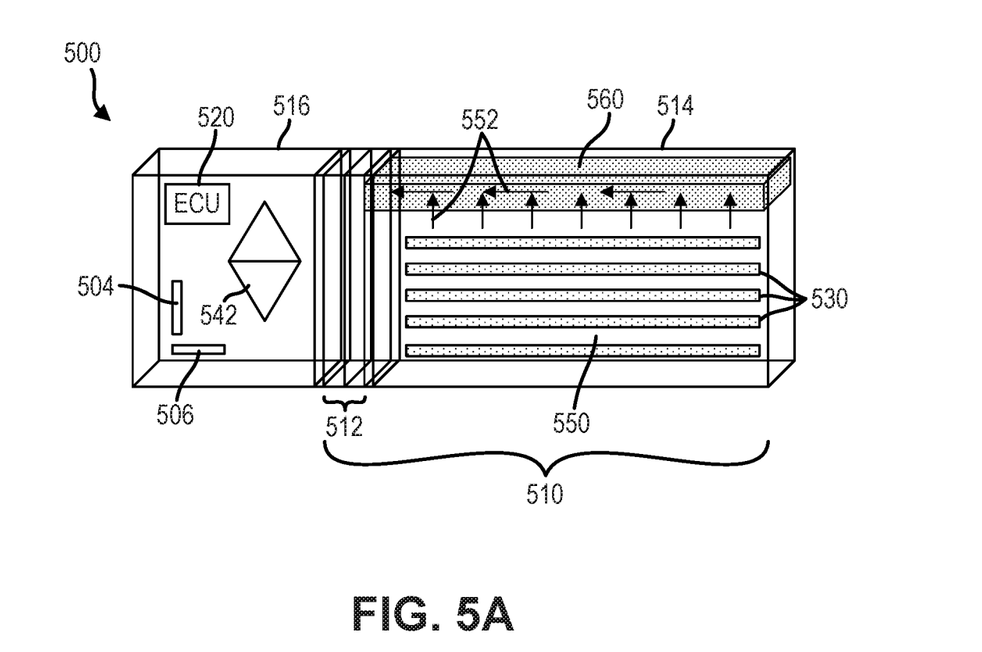
FIG. 5A illustrates an example fuel cell power and control system having a fuel carrier container removably coupled to a housing in accordance with aspects of the present disclosure.

With reference to FIG. 5A, a fuel cell power and control system ("system") 500 is illustrated, in accordance with various embodiments. System 500 may comprise a fuel cell 510 comprising a fuel carrier container ("container") 514 and a fuel cell stack 512. In various embodiments, fuel cell stack 512 may be similar to fuel cell stack 400 of FIG. 4.

Container 514 may contain a fuel carrier 550 and one or more temperature control elements 530. In various embodiments, the one or more temperature control elements 530 may be similar to the one or more temperature control elements 130 of FIG. 1. The one or more temperature control elements 530 may extend through fuel carrier 550 to provide even heating and/or cooling of fuel carrier 550.

Container 514 may contain a permeable membrane 560 separating the fuel carrier 550 from fuel cell stack 512. Fuel, represented by arrows 552, released from fuel carrier 550 may pass through permeable membrane 560 to fuel cell stack 512. In this regard permeable membrane 560 may prevent fuel carrier 550 from passing there through, while allowing fuel 552 to pass there through. In various embodiments, permeable membrane 560 may be comprised of a material conducive to hydrogen flow, such as silicon oxalate.

Fuel, such as hydrogen for example, may be released from fuel carrier 550 and may travel to an anode of fuel cell stack 512 whereby the fuel cell stack 512 may generate electricity as described herein. Fuel cell 510 may supply power to energy storage device 542. Energy storage device 542 may store energy and may be configured to supply electric power to a load, such as a motor for example. Energy storage device 542 may store energy and may be configured to supply electric power to the one or more temperature control elements 530. ECU 520 may control the supply of power to the one or more temperature control elements 530 based upon the voltage across energy storage device 542, as described herein.

Container 514 may be insulated or otherwise configured to contain heat within container 514. Container 514 may contain the fuel carrier 550, as well as released fuel, e.g., hydrogen. In various embodiments, container 514 may be made from a polymer.

Energy storage device 542 may be disposed in a housing 516. ECU 520 may be disposed in the housing 516. Energy storage device 542 and ECU 520 may be coupled to fuel cell stack 512 via housing 516.

System 500 may include a voltage selector 504. Voltage selector 504 may be moveable between various positions to select a desired voltage output from energy storage device 542. In this regard voltage selector 504 may comprise a switch. However, in various embodiments, voltage selector 504 may comprise machine-readable instructions, which may be loaded and executed by the ECU 120. Voltage selector 504 may be varied between various voltages, e.g., 3.3 V, 7 V, 11.1 V, 14.3 V, etc. Voltage selector 504 may be set based upon a predetermined power rating of a load powered by energy storage device 542.

System 500 may include a current selector 506. Current selector 506 may be moveable between various positions to select a desired current output from energy storage device 542. In this regard current selector 506 may comprise a switch. However, in various embodiments, current selector 506 may comprise machine-readable instructions, which may be loaded and executed by the ECU 120. Current selector 506 may be varied between various currents, e.g., 3 A, 5 A, 7 A, etc. Current selector 506 may be set based upon a predetermined power rating of a load powered by energy storage device 542.

Figure 5B:
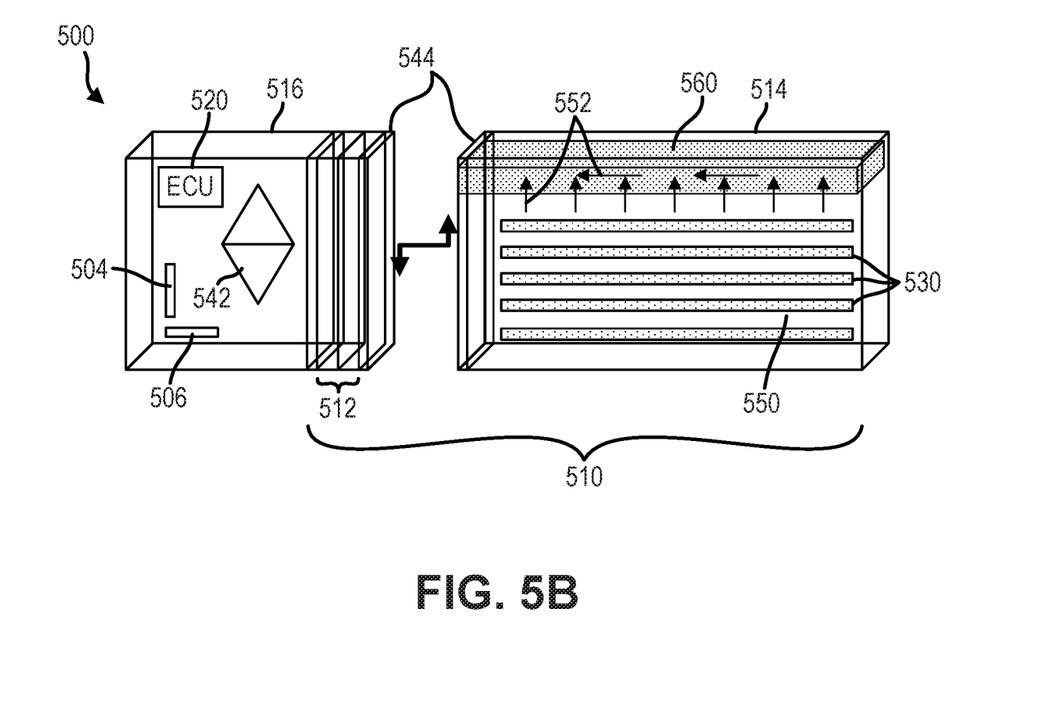
FIG. 5B illustrates the example fuel cell power and control system of FIG. 5A with the container decoupled from the housing via a quick release interface in accordance with aspects of the present disclosure.

With momentary reference to FIG. 5B, housing 516 may be removably coupled to container 514. In various embodiments, housing 516 may be removably coupled to container 514 via an interface 544 disposed between fuel cell stack 512 and container 514. In the illustrated embodiment, container 514 is separated from fuel cell stack 512 and the fuel cell stack 512 remains coupled to housing 516. However, in further embodiments container 514 and fuel cell stack 512 may be removably coupled to housing 516.

The interface 544 may provide a quick disconnect interface suitable for rapid connect and disconnect between fuel cell stack 512 and container 514. For example, ECU 520 may recognize a depletion of energy from fuel carrier 550 and may be configured to decouple the container 514, e.g., at the interface 544, from a vehicle, e.g., an aircraft. The ECU 520 may then indicate for the vehicle to move to an additional container whereby the vehicle may be coupled to the additional container. In this manner, the depleted container 514 may be exchanged for a charged new container having a fuel carrier full of fuel and one or more temperature control elements.

Figure 6A:
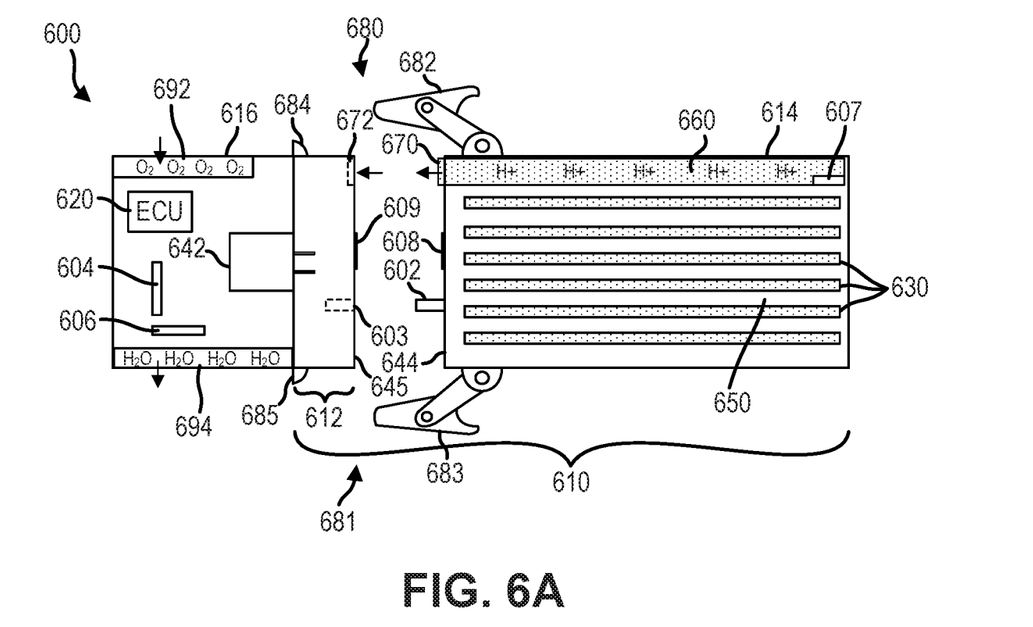
FIG. 6A illustrates the example fuel cell power and control system with the container decoupled from the housing via quick release attachment features in accordance with aspects of the present disclosure.
Figure 6B:
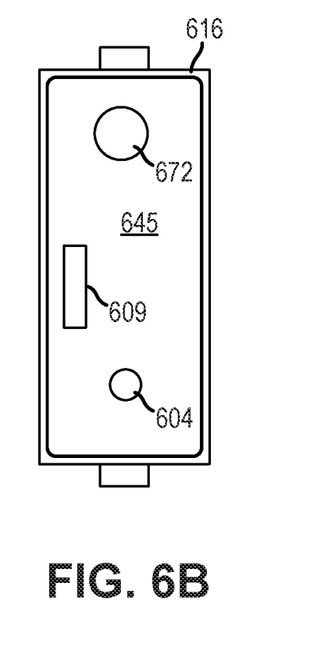
FIG. 6C illustrate the interface surfaces of the housing and the container, respectively, of FIG. 6A in accordance with aspects of the present disclosure.
Figure 6C:
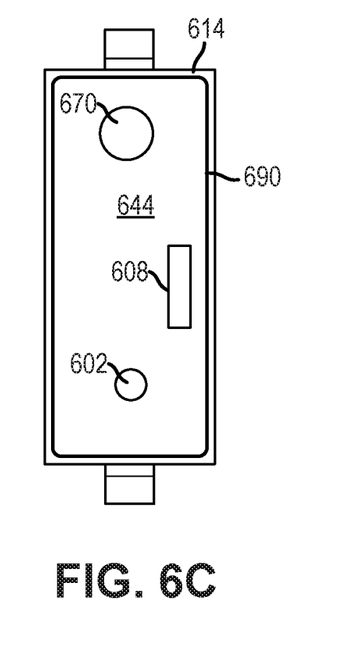

With combined reference to FIG. 6A, FIG. 6B, and FIG. 6C, a fuel cell power and control system ("system") 600 is illustrated, in accordance with various embodiments. In various embodiments, system 600 may be similar to system 500 of FIG. 5A and FIG. 5B. System 600 may comprise a fuel cell 610 comprising a fuel carrier container ("container") 614 and a fuel cell stack 612. In various embodiments, fuel cell stack 612 may be similar to fuel cell stack 400 of FIG. 4.

Container 614 may contain a fuel carrier 650 and one or more temperature control elements 630. In various embodiments, the one or more temperature control elements 630 may be similar to the one or more temperature control elements 130 of FIG. 1. The one or more temperature control elements 630 may extend through fuel carrier 650 to provide even heating and/or cooling of fuel carrier 650.

Container 514 may comprise an interface surface 644. A fuel outlet port 670 may be disposed on interface surface 644. Fuel outlet port 670 may be in fluidic communication with a permeable membrane 660. Permeable membrane 660 may route fuel, such as hydrogen, from container 614 to fuel cell stack 612 via fuel outlet port 670. In this regard, fuel cell stack 612 may comprise an interface surface 645 configured to interface with interface surface 644. A fuel inlet port 672 may be disposed on interface surface 645. Fuel inlet port 672 may be in fluidic communication with fuel outlet port 670 in response to container 614 being installed onto housing 516. In this manner, fuel may be transferred from container 614, through permeable membrane 660, through fuel outlet port 670, through fuel inlet port 672, and to fuel cell stack 612.

System 600 may include a voltage selector 604. In various embodiments, voltage selector 604 may be similar to voltage selector 504 of FIG. 5A and FIG. 5B. System 600 may include a current selector 606. In various embodiments, current selector 606 may be similar to current selector 506 of FIG. 5A and FIG. 5B. System 600 may include an ECU 620. In various embodiments, ECU 620 may be similar to ECU 520 of FIG. 5A and FIG. 5B.

Housing 616 may be removably coupled to container 614. In various embodiments, housing 516 may be removably coupled to container 514 via a first attachment feature 680 and a second attachment feature 681. First attachment feature 680 may comprise a first member 682 coupled to container 614 and a second member 684 coupled to housing 616. First member 682 may mechanically engage second member 684 to retain container 614 to housing 616. In various embodiments, first attachment feature 680 may comprise a latch mechanism. First attachment feature 680 may comprise any suitable quick-release attachment mechanism such as, for example, a spring latch, a slam latch, or a cam latch, among others. In this regard first member 682 may be configured to rotate about a pivot. In various embodiments, first member 682 may comprise a clasp, or a clamp, among others. In various embodiments, second member 684 may comprise a boss feature extending from housing 616, a hook, an aperture, or a cam, among others. In this regard, first attachment feature 680 may extend across interface surface 644 and interface surface 645 in response to first attachment feature 680 being in an installed position with first member 682 mechanically engaged with second member 684. Second attachment feature 681 may comprise a first member 683 coupled to container 614 and a second member 685 coupled to housing 616. Second attachment feature 681 may be similar to first attachment feature 680. First attachment feature 680 and second attachment feature 681 may provide a quick disconnect interface suitable for rapid connect and disconnect between housing 616 and container 614.

An alignment pin 602 may extend from interface surface 644. A pin aperture 603 may be disposed in interface surface 645. Alignment pin 602 may be received by pin aperture 603 during installation of container 614 to housing 616.

A temperature sensor 607 may be disposed in container 614. Temperature sensor 607 may be in electronic communication with a first temperature sensor relay 608. First temperature sensor relay 608 may be disposed on interface surface 644. A second temperature sensor relay 609 may be disposed on interface surface 645, First temperature sensor relay 608 and second temperature sensor relay 609 may comprise an electrically conductive material, such as copper for example. First temperature sensor relay 608 and second temperature sensor relay 609 may be in contact in response to container 614 being installed onto housing 616 to provide a signal bus by which ECU 620 may monitor the temperature in container 614. In various embodiments, first temperature sensor relay 608 and second temperature sensor relay 609 may be formed as plates.

An oxidizer port 692 may be disposed in housing 616. Oxidizer port 692 may allow an oxidizer, such as oxygen for example, to enter housing 616 for supplying the oxidizer to fuel cell stack 612. In this regard, oxidizer port 692 may be in fluidic communication with fuel cell stack 612. An evaporation port 694 may be disposed in housing 616. Evaporation port 694 may allow water and/or water vapor to be exhausted from housing 616. In this regard, evaporation port 694 may be in fluidic communication with fuel cell stack 612.

With particular focus on FIG. 6B and FIG. 6C, a gasket 690 may be coupled between interface surface 644 and interface surface 645. Gasket 690 may prevent fuel, e.g., hydrogen, from leaking between interface surface 644 and interface surface 645.

Figure 7:
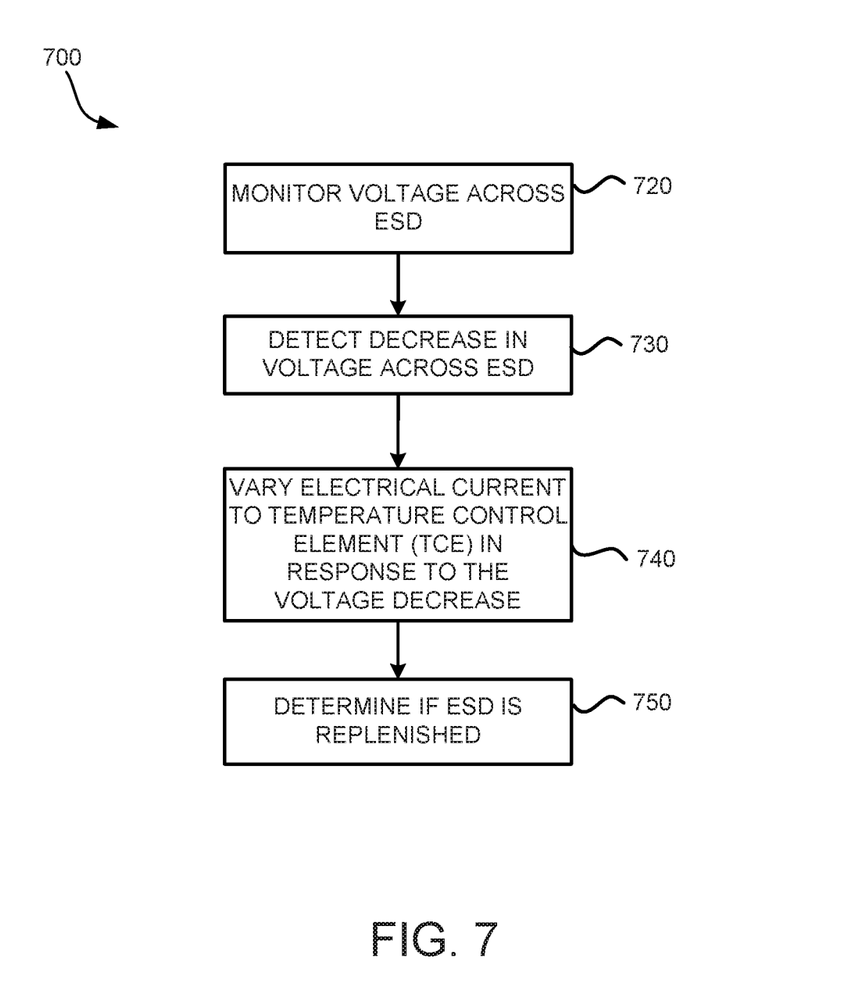
FIG. 7 shows a flowchart of a method for replenishing an energy storage device using a fuel cell in accordance with aspects of the present disclosure.

With reference to FIG. 7, a flow chart illustrating a method 700 for replenishing an energy storage device using a fuel cell is illustrated, in accordance with various embodiments. Method 700 includes monitoring voltage across the energy storage device (step 720). Method 700 includes detecting a decrease in voltage across the ESD (step 730). Method 700 includes varying electrical current supplied to a temperature control element in response to the increase in voltage draw (step 740), Method 700 includes determining if the energy storage device is replenished (step 730).

With combined reference to FIG. 5A and FIG. 7, step 720 may include monitoring, by ECU 520, a voltage draw across energy storage device 542. Step 730 may include detecting; by ECU 520, a decrease in voltage across the energy storage device 542. Step 740 may include varying, by ECU 520, electrical current supplied to the one or more temperature control elements 530 in response to the decrease in voltage across the energy storage device 542. The one or more temperature control elements 530 may increase in temperature in response to the power, heating the fuel carrier 550 and increasing the rate of fuel 552 being released by the fuel carrier 550, thereby increasing electrical power production of fuel cell 510. Step 750 may include determining, by ECU 520, if the energy storage device 542 is replenished. In various embodiments, ECU 520 may determine if the energy storage device 542 is replenished by measuring a voltage across energy storage device 542.

In various embodiments, the fuel carrier 550 for the fuel cell may comprise nickel mixed with AB (Ni+NH$_3$BH$_3$). Mixing nickel with the AB may reduce the temperature required for maximum release of hydrogen from the fuel carrier (e.g., see maximum temperature of region 306 in FIG. 3), thereby reducing the necessary heat to produce maximum hydrogen release, e.g. compressing the temperature scale to control hydrogen generation. For example, with combined reference to FIG. 3 and FIG. 8, adding nickel powder to the AB may reduce the temperature associated with the maximum release rate 308 by as much as three times (3×) what the required temperature in order to achieve the maximum release rate would otherwise be. In various embodiments, the temperature associated with the maximum release rate 308 may approximately 100° C. (212° F.), wherein the term approximately in this regard may mean±20° C. 36° F.). Reducing the operating temperature of the fuel cell may allow for reduced size of the fuel cell. For example, reducing the operating temperature by three times may result in a reduction of size of the fuel cell by as much as five times (5×).

Figure 8:
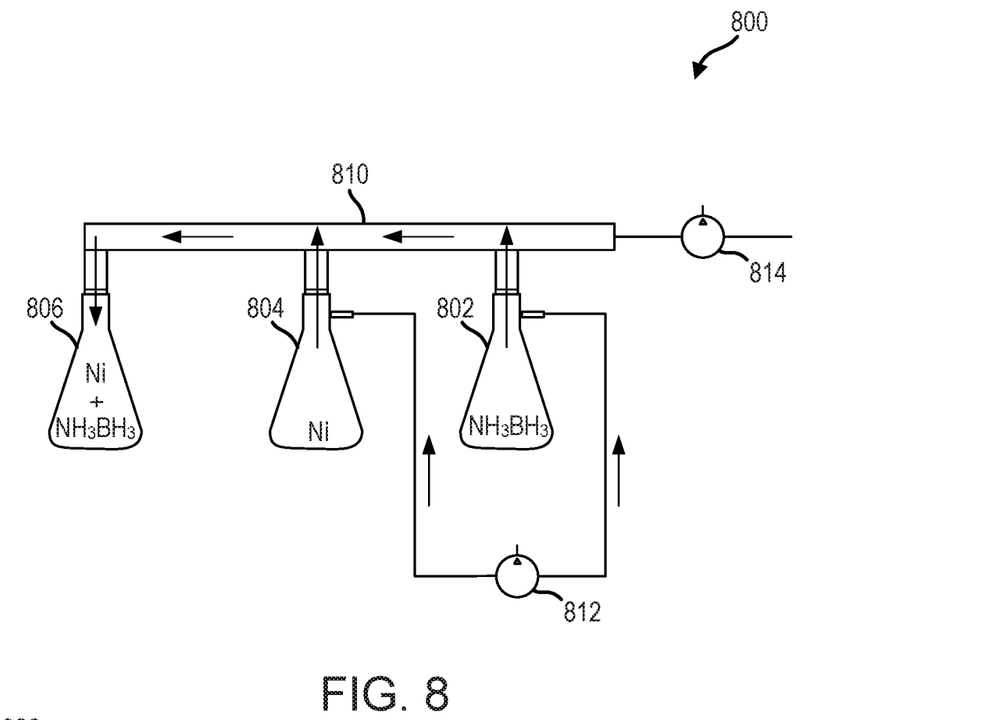
FIG. 8 illustrates an example system for manufacturing a fuel carrier in accordance with aspects of the present disclosure.

With reference to FIG. 8, a system 800 for manufacturing a fuel carrier is illustrated, in accordance with various embodiments. System 800 may include a first vessel 802 for containing AB powder, a second vessel 804 for containing nickel powder, and a third vessel for capturing the nickel ammonia borane mixture. A first dry air compressor 812 may apply pressure to first vessel 802 and second vessel 804, atomizing the associated powders contained therein. Arrows in FIG. 8 illustrate the flow of gas and/or powder. The amount of pressure applied to each vessel 802, 804 may depend on the amount of compound contained therein. As pressure increases, the powders are forced out the top of each vessel 802, 804 into a mixing tube 810. Nickel powder may cover, or otherwise mix with, the ammonia borane powder in the mixing tube 810. A second dry air compressor 814 may apply pressure to mixing tube 810 to keep the mixed substrate atomized until it enters the third vessel 806. The mixed substrate may be routed into the third vessel 806.

Once enough nickel ammonia borane is produced, the compound is transferred to a substrate chamber. The substrate is pressed into the substrate chamber to form a "cake." Once the substrate chamber has been filled, a cover is tightened over the chamber and is ready to connect to the electronic components of a hydrogen fuel cell. For example, with combined reference to FIG. 5B and FIG. 8, the mixed substrate may be moved into fuel carrier container 514. Temperature control elements 530 may be disposed in fuel carrier container 514 before the mixed substrate is disposed therein.

Figure 9:
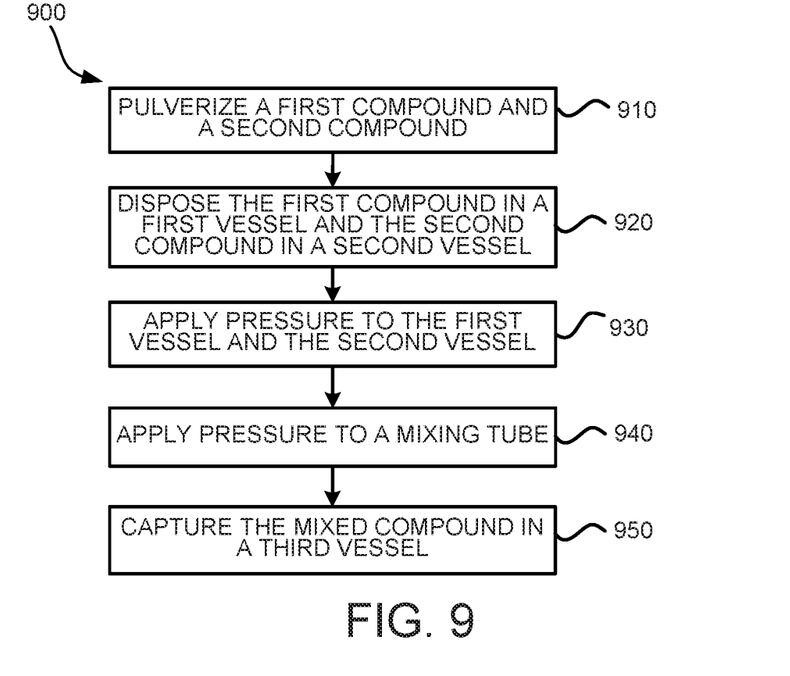
FIG. 9 shows a flowchart of a process for manufacturing a fuel carrier in accordance with aspects of the present disclosure.

With reference to FIG. 9, a method 900 for manufacturing a temperature sensitive fuel carrier for a fuel cell is illustrated, in accordance with various embodiments. Method 900 includes pulverizing a first compound and a second compound (step 910). Method 900 includes disposing the first and second compounds into first and second vessels, respectively (step 920). Method 900 includes applying pressure to the first vessel and the second vessel (step 930). Method 900 includes applying pressure to a mixing tube (step 940). Method 900 includes capturing a mixed compound in a third vessel (step 950).

With combined reference to FIG. 8 and FIG. 9, step 910 may include pulverizing nickel into a powder and/or pulverizing AB into a powder. Step 910 may include grinding, crushing, milling, or any other suitable technique. Step 920 may include disposing the powdered AB into first vessel 802 and the powdered nickel into second vessel 804. Step 930 may include applying pressure to first vessel 802 and second vessel 804 via first dry air compressor 812. Step 940 may include applying pressure to mixing tube 810 via second dry air compressor 814. Step 950 may include capturing the mixed compound. i.e., the nickel AB, in third vessel 806. In various embodiments, fuel carrier 550 of FIG. 5A may be manufactured using method 900.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may, include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A fuel cell power and control system, comprising:
a fuel cell stack configured to generate electric power;
a container;
a fuel carrier for the fuel cell stack, wherein the fuel carrier is contained within the container, and wherein the fuel carrier comprises a nickel ammonia borane mixture;
a permeable membrane separating the fuel carrier from the fuel cell stack, wherein a fuel from the fuel carrier can pass through the permeable membrane but the fuel carrier is unable to pass through the permeable membrane, and wherein the fuel is hydrogen;
a temperature control element in thermal communication with the fuel carrier; and
an electronic control unit (ECU) configured to regulate electric current supplied to the temperature control element to vary a rate at which a fuel is released from the fuel carrier.

2. The system of claim 1, further comprising an energy storage device configured to receive the electric power from the fuel cell stack.

3. The system of claim 2, further comprising a sensor configured to measure a voltage across the energy storage device.

4. The system of claim 3, wherein the ECU is configured to change the electric current supplied to the temperature control element in response to the voltage across the energy storage device decreasing.

5. The system of claim 3, wherein the ECU is configured to increase the electric current supplied to the temperature control element in response to the voltage across the energy storage device decreasing.

6. The system of claim 1, wherein the fuel cell stack comprises:
a fuel cell assembly comprising:
an anode plate;
a cathode plate; and
an electrolyte disposed between the anode plate and the cathode plate.

7. The system of claim 2, further comprising:
a container wherein the fuel carrier and the temperature control element are contained; and
a housing wherein the energy storage device is contained;
wherein the container is removably coupled to the housing via an interface.

8. The system of claim 7, wherein the fuel cell stack is coupled to the housing, the interface is disposed between the fuel cell stack and the container.

9. The system of claim 7, further comprising a first interface surface disposed on the container and a second interface surface disposed on the fuel cell stack, wherein the first interface surface interfaces with the second interface surface.

10. The system of claim 9, further comprising a fuel outlet port disposed on the first interface surface and a fuel inlet port disposed on the second interface surface.

11. The system of claim 9, further comprising an alignment pin extending from the first interface surface and a pin aperture disposed on the second interface surface, wherein the pin aperture receives the alignment pin.

12. The system of claim 9, further comprising a first temperature sensor relay disposed on the first interface surface and a second temperature sensor relay disposed on the second interface surface, wherein the first temperature sensor relay and the second temperature sensor relay contact each other in response to the container being installed onto the fuel cell stack.

13. The system of claim 1, further comprising a temperature sensor disposed in a container.

14. The system of claim 1, further comprising an attachment feature extending across a first interface surface and a second interface surface.

* * * * *